US011268406B2

(12) United States Patent
Stanescu et al.

(10) Patent No.: US 11,268,406 B2
(45) Date of Patent: Mar. 8, 2022

(54) MOVEMENT-LIMITING DEVICE FOR A TURBINE ENGINE AND ASSOCIATED METHOD

(71) Applicant: The Boeing Company, Chicago, IL (US)

(72) Inventors: Adrian Stanescu, Maple Valley, WA (US); Jennifer Bender Zielinski, Kent, WA (US); Michael Patrick Foy, Kirkland, WA (US); Daniel F. Gelzer, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 16/537,976

(22) Filed: Aug. 12, 2019

(65) Prior Publication Data

US 2021/0047942 A1 Feb. 18, 2021

(51) Int. Cl.
*F01D 25/24* (2006.01)
*B64D 29/06* (2006.01)
(Continued)

(52) U.S. Cl.
CPC ........... *F01D 25/243* (2013.01); *B64D 29/06* (2013.01); *F01D 25/265* (2013.01); *F01D 25/28* (2013.01);
(Continued)

(58) Field of Classification Search
CPC ...... F01D 25/243; F01D 25/24; F01D 25/265; F01D 25/28; F05D 2240/14;
(Continued)

(56) References Cited

U.S. PATENT DOCUMENTS

| 4,658,579 A | 4/1987 | Bower et al. |
| 6,334,588 B1 * | 1/2002 | Porte ...................... B64D 29/06 244/129.4 |

(Continued)

OTHER PUBLICATIONS

European Search Report from the corresponding European Application No. 20190543, dated Dec. 2, 2020.

*Primary Examiner* — Woody A Lee, Jr.
*Assistant Examiner* — Jesse M Prager
(74) *Attorney, Agent, or Firm* — Womble Bond Dickinson (US) LLP

(57) ABSTRACT

A movement- and/or load transfer-limiting device for a turbine engine, comprises a first fitting including a retention member, with the first fitting being engaged with a fancase surrounding a turbine engine fan blade system. A second fitting is engaged with a fancowl disposed radially outward of the fancase. The second fitting includes a constraint member arranged to be received by the retention member. The retention member is arranged to limit radially outward movement of the fancowl via engagement with the constraint member. The constraint member comprises at least one of (i) a hook member arranged to limit radially inward movement of the first fitting in relation to the fancowl or (ii) a laterally-extending shaft having opposed ends and a flange engaged with at least one of the ends, arranged to limit lateral movement of the retention member in relation to the first fitting. Associated devices and methods are also provided.

30 Claims, 10 Drawing Sheets

Figure 1:
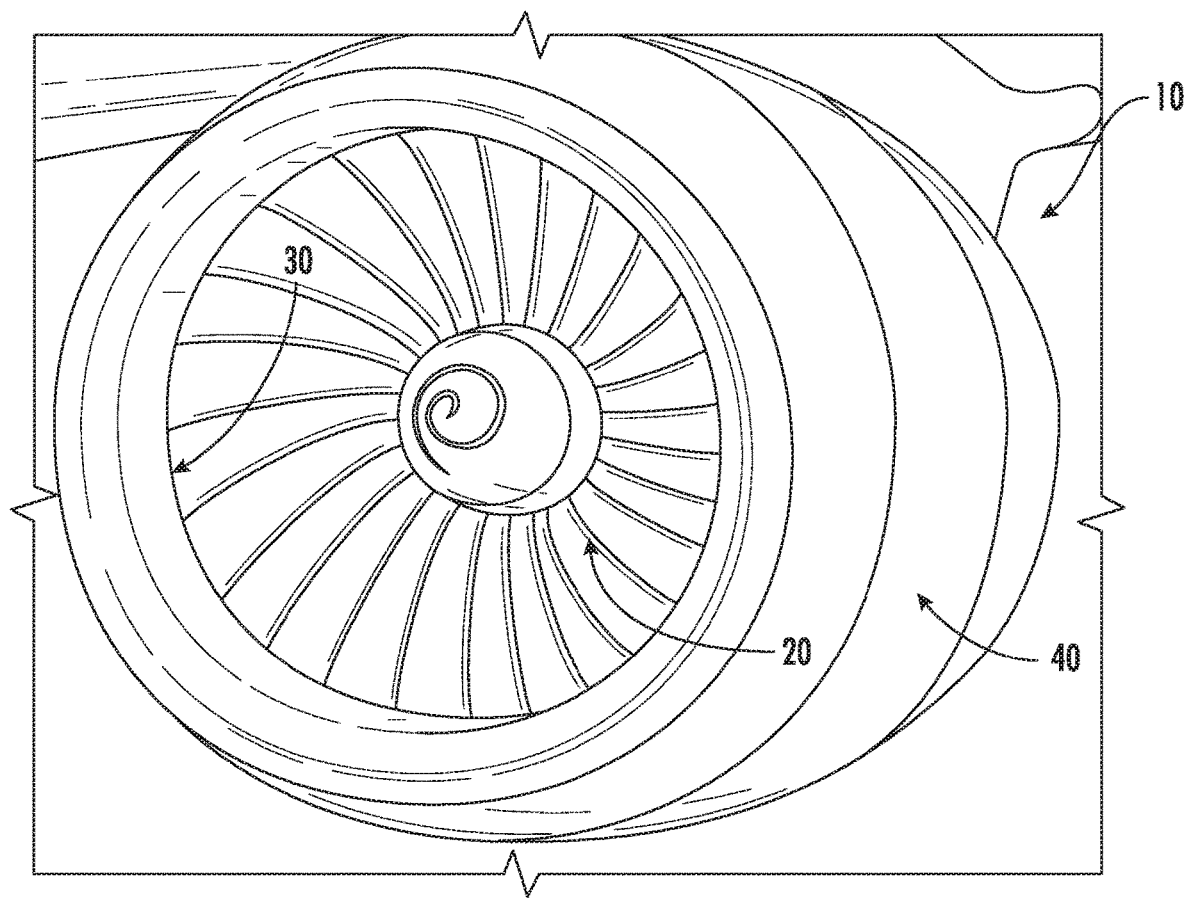

(51) Int. Cl.
*F01D 25/26* (2006.01)
*F01D 25/28* (2006.01)

(52) U.S. Cl.
CPC .... *F05D 2220/323* (2013.01); *F05D 2240/14* (2013.01); *F05D 2260/30* (2013.01)

(58) Field of Classification Search
CPC ........... F05D 2220/323; F05D 2260/30; F05D 2260/36; B64D 29/06
See application file for complete search history.

(56) References Cited

U.S. PATENT DOCUMENTS

| | | | |
|---|---|---|---|
| 2011/0174930 A1* | 7/2011 | Porte | B64D 29/08 244/131 |
| 2013/0140832 A1* | 6/2013 | Do | E05B 65/0817 292/177 |
| 2015/0167586 A1 | 6/2015 | Provost | |
| 2016/0145918 A1* | 5/2016 | Liang | B64C 1/1446 292/99 |
| 2018/0127107 A1 | 5/2018 | Delaney et al. | |
| 2018/0170566 A1* | 6/2018 | Paolini | B64D 29/06 |
| 2018/0283204 A1 | 10/2018 | Fracchia et al. | |
| 2018/0362173 A1 | 12/2018 | Delaney et al. | |

* cited by examiner

US 11,268,406 B2

MOVEMENT-LIMITING DEVICE FOR A TURBINE ENGINE AND ASSOCIATED METHOD

BACKGROUND

Field of the Disclosure

The present disclosure relates to turbine engines and, more particularly, to a movement-limiting device for an aircraft turbine engine having a rotating fan blade system.

Description of Related Art

A turbine engine, for example, for an aircraft, generally includes a rotating fan blade system surrounded by a fancase. Because of the nature of the rotating turbine engine fan blade system, the fancase surrounding the fan blade system is generally cylindrical. In addition, since the fancase may not necessarily provide the desired aerodynamics, and since other systems of the turbine engine may be mounted to or routed on an outer surface of the fancase, the fancase of the turbine engine is surrounded by a fancowl or otherwise has a fancowl disposed radially outward thereof.

In such instances, the fancowl is mounted about the fancase in a secure manner, but is also desirably removable, or at least partially removable, so as to allow access to the systems of the turbine engine mounted to or routed on the outer surface of the fancase, or even to the fan blade system within the fancase. As such, some turbine engines have portions of the fancowl that are pivotable toward and away from the fancase, so as to provide access into the fancowl for allowing technicians to conduct maintenance, perform repairs, or the like. In some instances, the pivoting portion of the fancowl is secured to the fancase by a fitting system, when the pivoting portion is pivoted to a closed position covering the corresponding portion of the fancase. Such a fitting system often includes a first fitting engaged with the fancase and a second fitting engaged with the pivoting portion of the fancowl. The first and second fitting are generally configured to releasably engage each other to allow the pivoting portion to be properly located with respect to the fancase when closed, but to be capable of allowing the pivoting portion to be pivoted open when required.

Some existing fitting systems, however, have first and second fitting that engage each other in a rigid connection. For example, the first fitting can include a rigid bracket mounted to the fancase, and the second fitting can include a rigid bracket mounted to the fancowl, wherein the second fitting includes a connecting pin mounted to the rigid bracket and the rigid bracket of the first fitting defines a receiving bore for receiving the connecting pin when the pivoting portion of the fancowl is pivoted to the closed position. The engagement of the connecting pin with the receiving bore thus serves to locate the pivoting portion of the fancowl in proper relation to the fancase such that the pivoting portion can otherwise be latched in the closed position.

In a fan blade out event, inadvertent separation of a fan blade in the fan blade system may result in less than optimal performance. In some instances, the fancase (or portions thereof) can move radially outward in relation to the fancowl. A rigid connection between the fancase and fancowl by way of an existing fitting system may result in the transmission of force loads from the fancase to the fancowl by way of the fitting system, which may also result in less than optimal performance.

Thus, there exists a need for a fitting system for a pivoting portion of a fancowl for a turbine engine that is capable of appropriately locating the pivoting portion in relation to the underlying fancase, when the pivoting portion is pivoted to the closed position. Such a fitting system should desirably be arranged to guide the second fitting into engagement with the first fitting, upon the pivoting portion being pivoted to the closed position, so as to facilitate proper location of the pivoting portion. Moreover, with the pivoting portion in the closed position, the fitting system should desirably be configured and arranged to attenuate radially outward force loads from the fancase to the fancowl and to limit movement of the fancase fitting relative to the fancowl fitting, so as to inhibit undesirable displacement of or damage to the fancowl.

SUMMARY

The above and other needs are met by aspects of the present disclosure which, in one aspect, provides a movement-limiting device for a turbine engine, comprising a first fitting including a retention member, wherein the first fitting is engaged with a fancase surrounding a turbine engine fan blade system. A second fitting is engaged with a fancowl disposed radially outward of the fancase, wherein the second fitting includes a constraint member arranged to be received by the retention member of the first fitting. The retention member is arranged to limit radially outward movement of the fancowl via engagement with the constraint member, and the constraint member comprising at least one of (i) a hook member arranged to limit radially inward movement of the first fitting in relation to the fancowl or (ii) a laterally-extending shaft having opposed ends and a flange engaged with at least one of the opposed ends, arranged to limit lateral movement of the retention member in relation to the first fitting.

Another aspect of the disclosure provides a movement-limiting device for a turbine engine having a fancase surrounding a turbine engine fan blade system. Such a device comprises a first fitting including spaced-apart struts engaged with the fancase and extending outward to respective distal ends, and a crossmember extending between the distal ends to form a loop arrangement. The first fitting further includes adjacent retention members, wherein each retention member comprises a support ledge. The support ledge of each retention member is engaged with and extends laterally from the distal end of one of the struts. A second fitting is engaged with a fancowl disposed radially outward of the fancase, wherein the second fitting includes a laterally-extending shaft having opposed ends and a flange engaged with each of the opposed ends. The shaft is arranged to be received by the support ledges of the adjacent ramp members, with the flanges being arranged to limit lateral movement of the shaft in relation to the adjacent support ledges and to limit lateral separation between the adjacent retention members. The first fitting is arranged to limit radially outward movement of the fancowl via engagement with the second fitting.

A further aspect of the disclosure provides a movement-limiting device for a turbine engine having a fancase surrounding a turbine engine fan blade system. Such a device comprises a first fitting including spaced-apart struts engaged with the fancase and extending outward to respective distal ends, and a crossmember extending between the distal ends to form a loop arrangement. The first fitting further includes adjacent retention members, wherein each retention member comprises a support ledge. The support ledge of each retention member is engaged with and extends laterally from the distal end of one of the struts. A second fitting is engaged with a fancowl disposed radially outward of the fancase, wherein the second fitting includes an inverted hook member arranged to be received through the loop arrangement, to limit radially inward movement of the first fitting engaged with the fancase in relation to the fancowl.

Still another aspect of the disclosure provides a movement-limiting device for a turbine engine having a fancase surrounding a turbine engine fan blade system. Such a device comprises a first fitting including spaced-apart struts engaged with the fancase and extending outward to respective distal ends, and a crossmember extending between the distal ends to form a loop arrangement. The first fitting further includes adjacent retention members, wherein each retention member comprises a support ledge. The support ledge of each retention member is engaged with and extends laterally from the distal end of one of the struts. A second fitting is engaged with a fancowl disposed radially outward of the fancase, wherein the second fitting includes a laterally-extending shaft having opposed ends and a flange engaged with each of the opposed ends. The shaft is arranged to be received by the support ledges of the adjacent ramp members, with the flanges being arranged to limit lateral movement of the shaft in relation to the adjacent support ledges and to limit lateral separation between the adjacent retention members. The second fitting further includes an inverted hook member arranged to be received through the loop arrangement. The first fitting is arranged to limit radially outward movement of the fancowl via engagement with the second fitting. The second fitting is arranged to limit radially inward movement of the first fitting engaged with the fancase in relation to the fancowl.

Yet another aspect of the disclosure provides a method of limiting movement in a turbine engine including a first fitting having a retention member and being engaged with a fancase surrounding a turbine engine fan blade system. Such a method comprises engaging a constraint member of a second fitting with the retention member of the first fitting, wherein the second fitting is engaged with a fancowl disposed radially outward of the fancase. The constraint member and the retention member are engaged such that the retention member is arranged to limit radially outward movement of the fancowl via engagement with the constraint member, and such that the constraint member is arranged to allow radially outward movement of the retention member engaged with the fancase.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2:
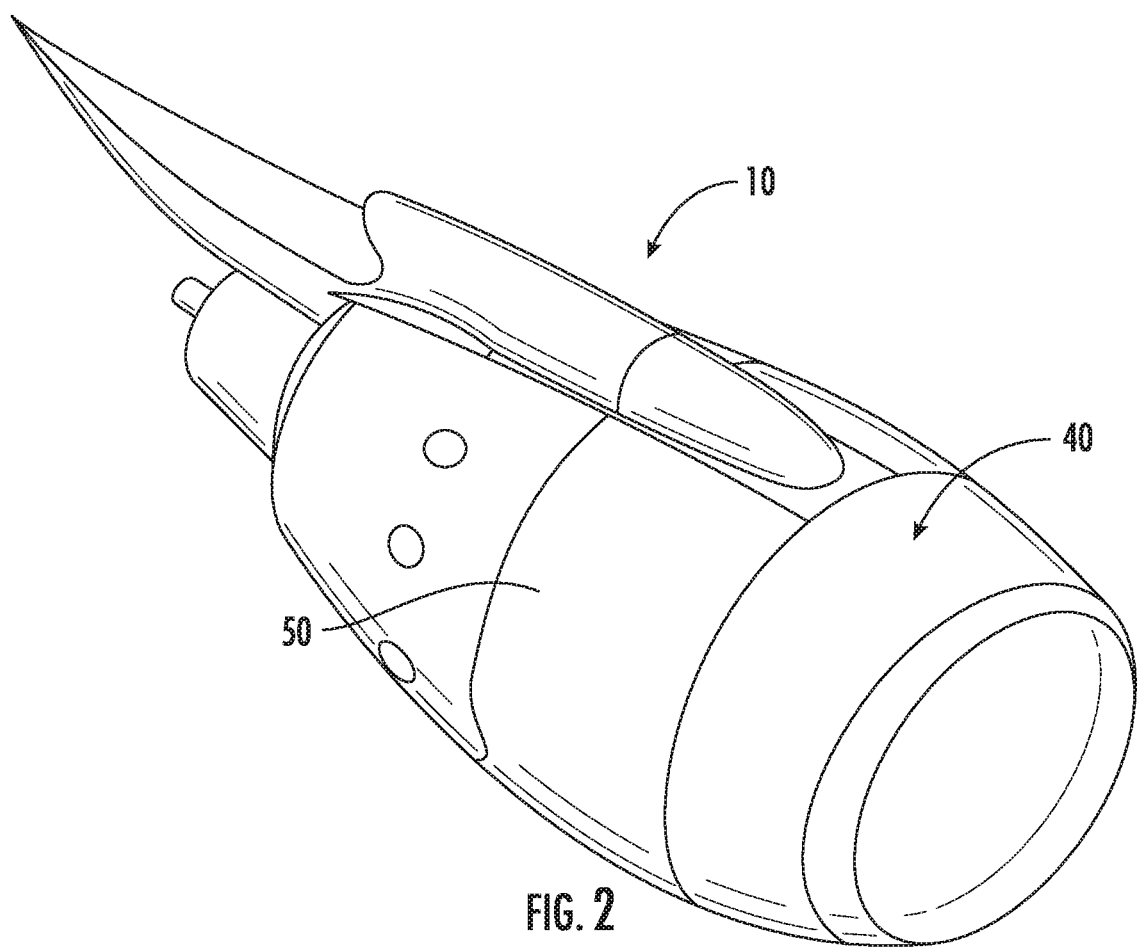
Figure 3:
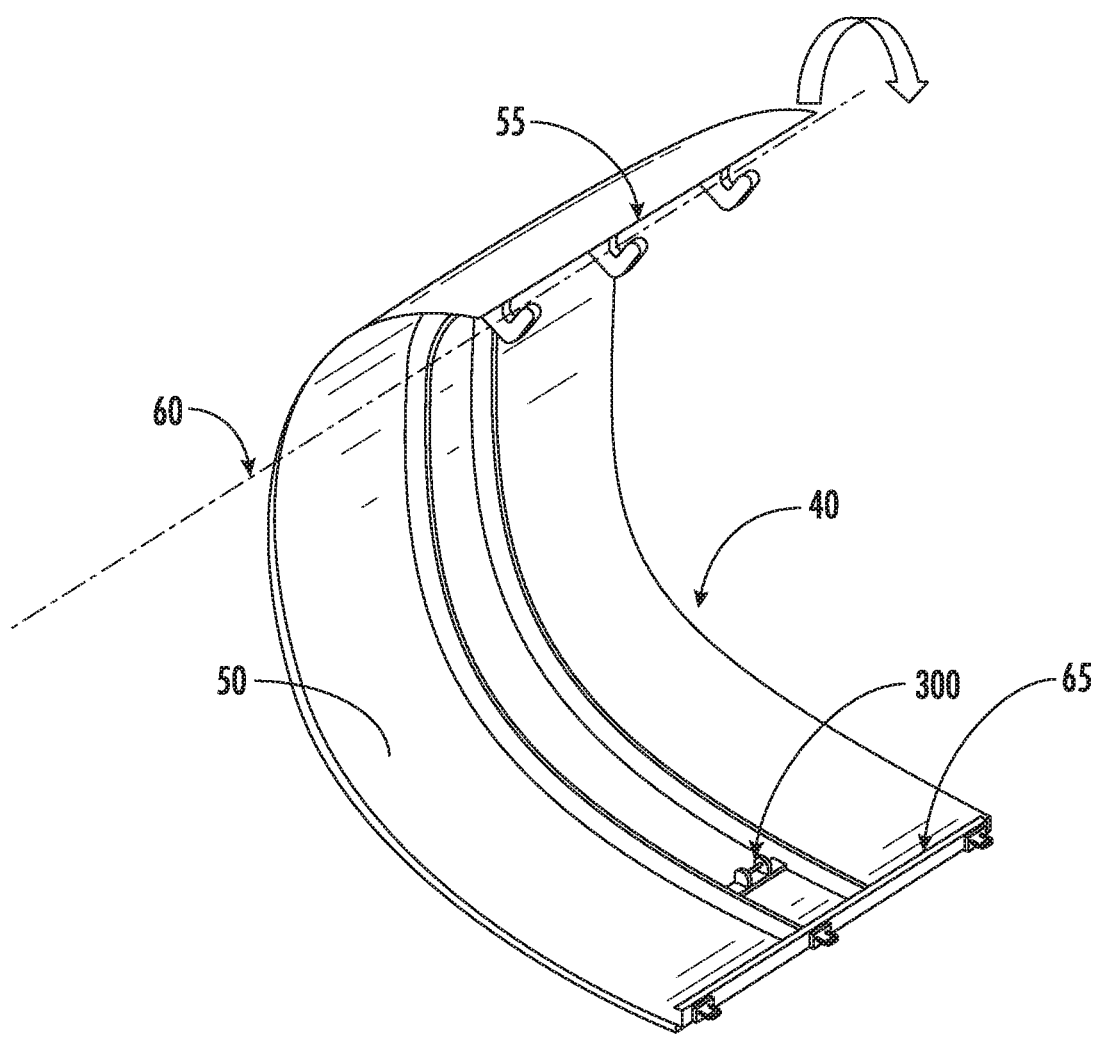
Figure 4:
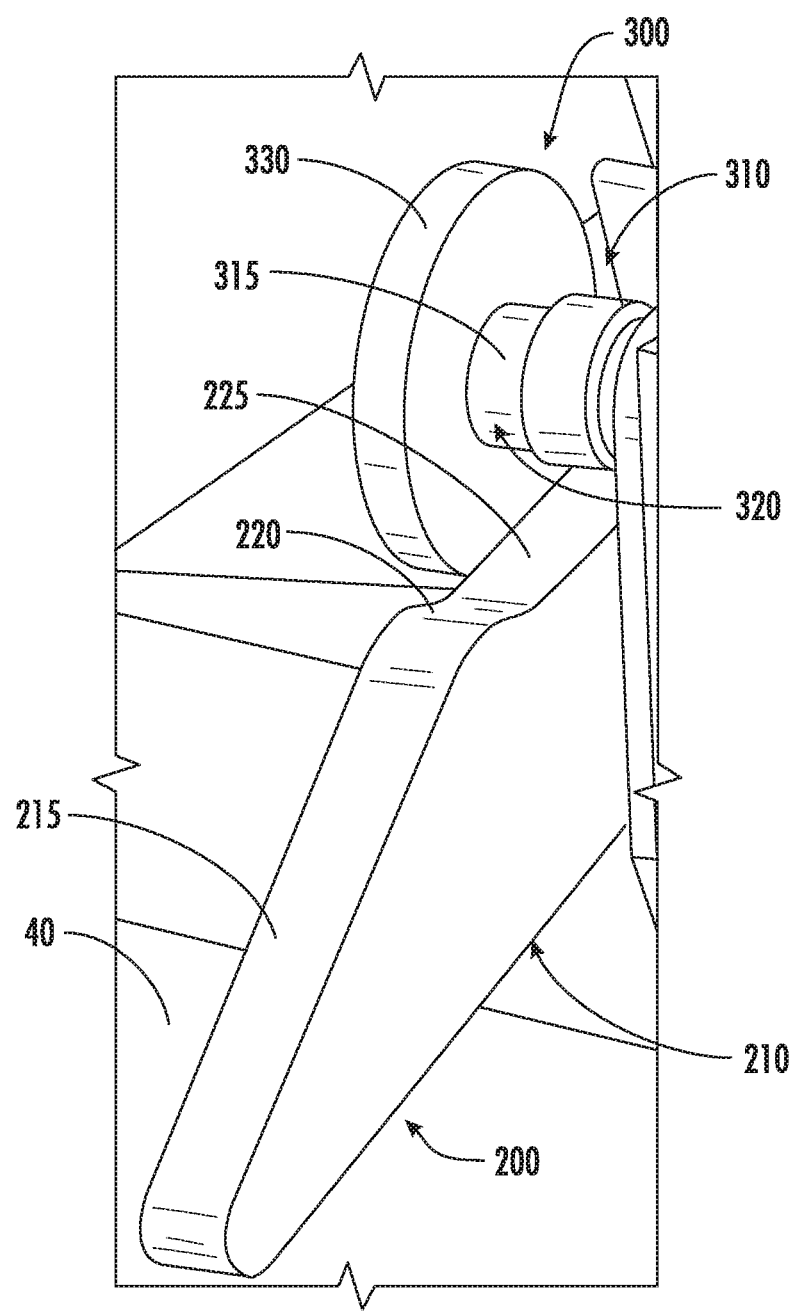
Figure 5:
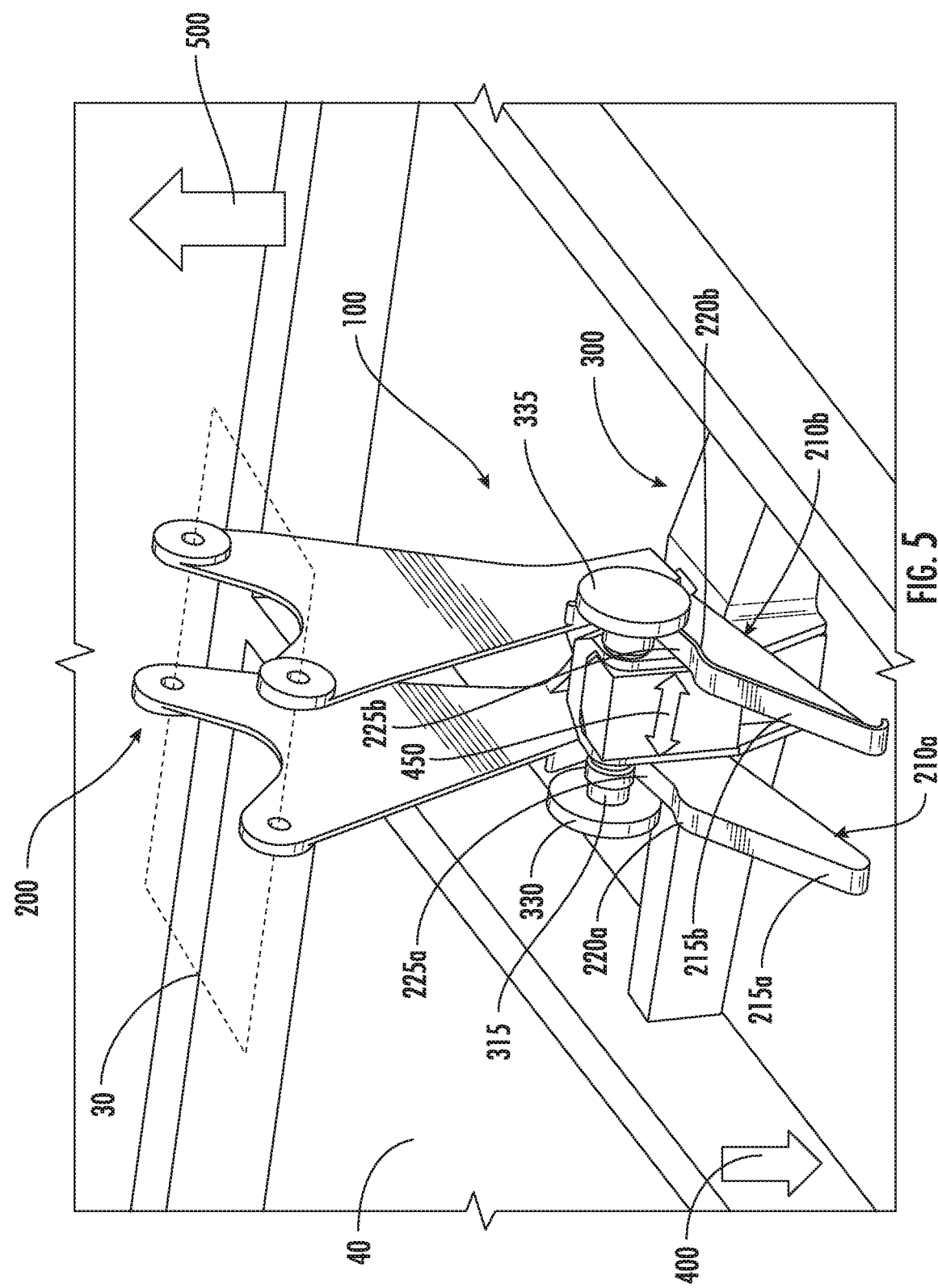
Figure 6:
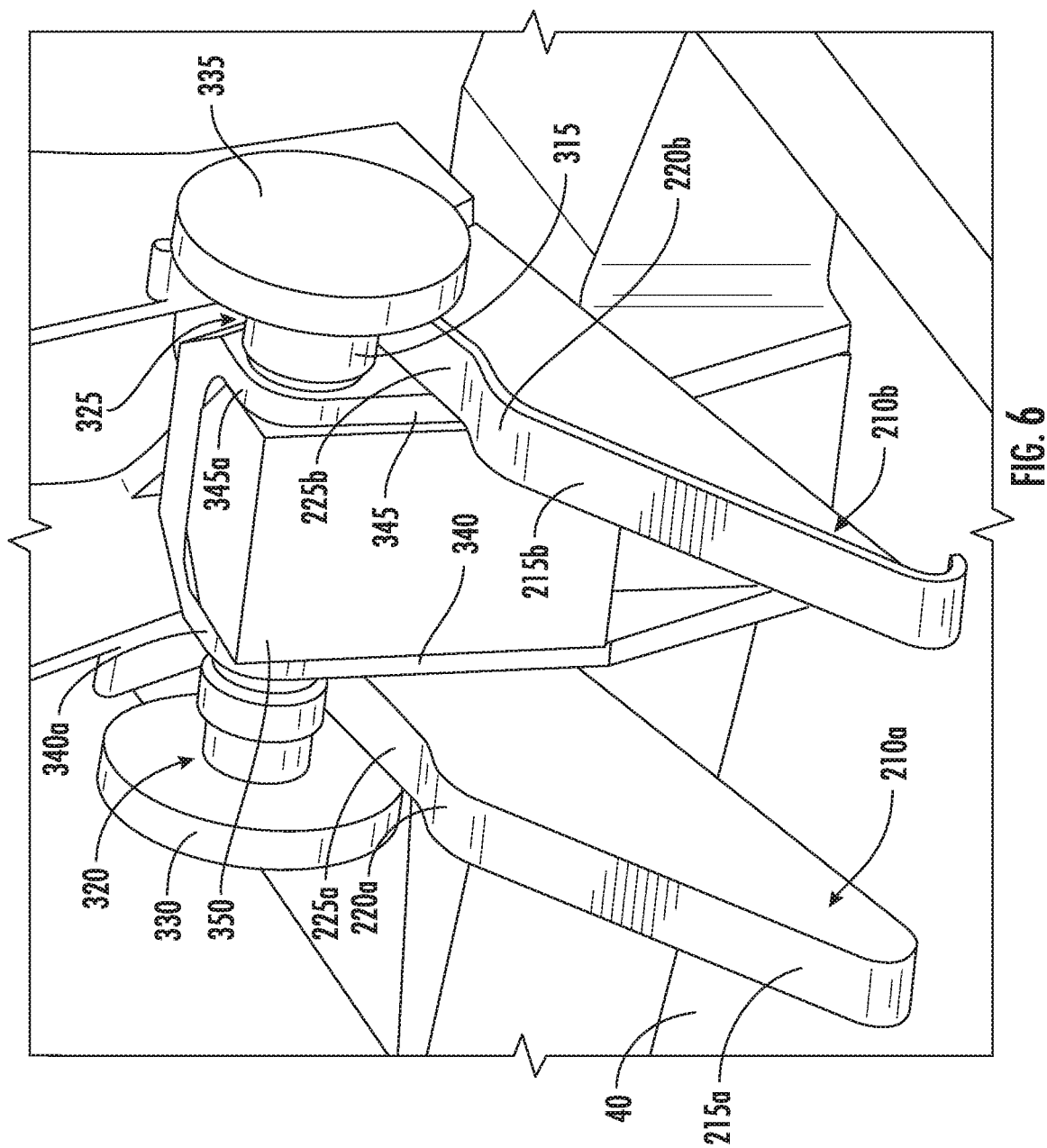
Figure 7:
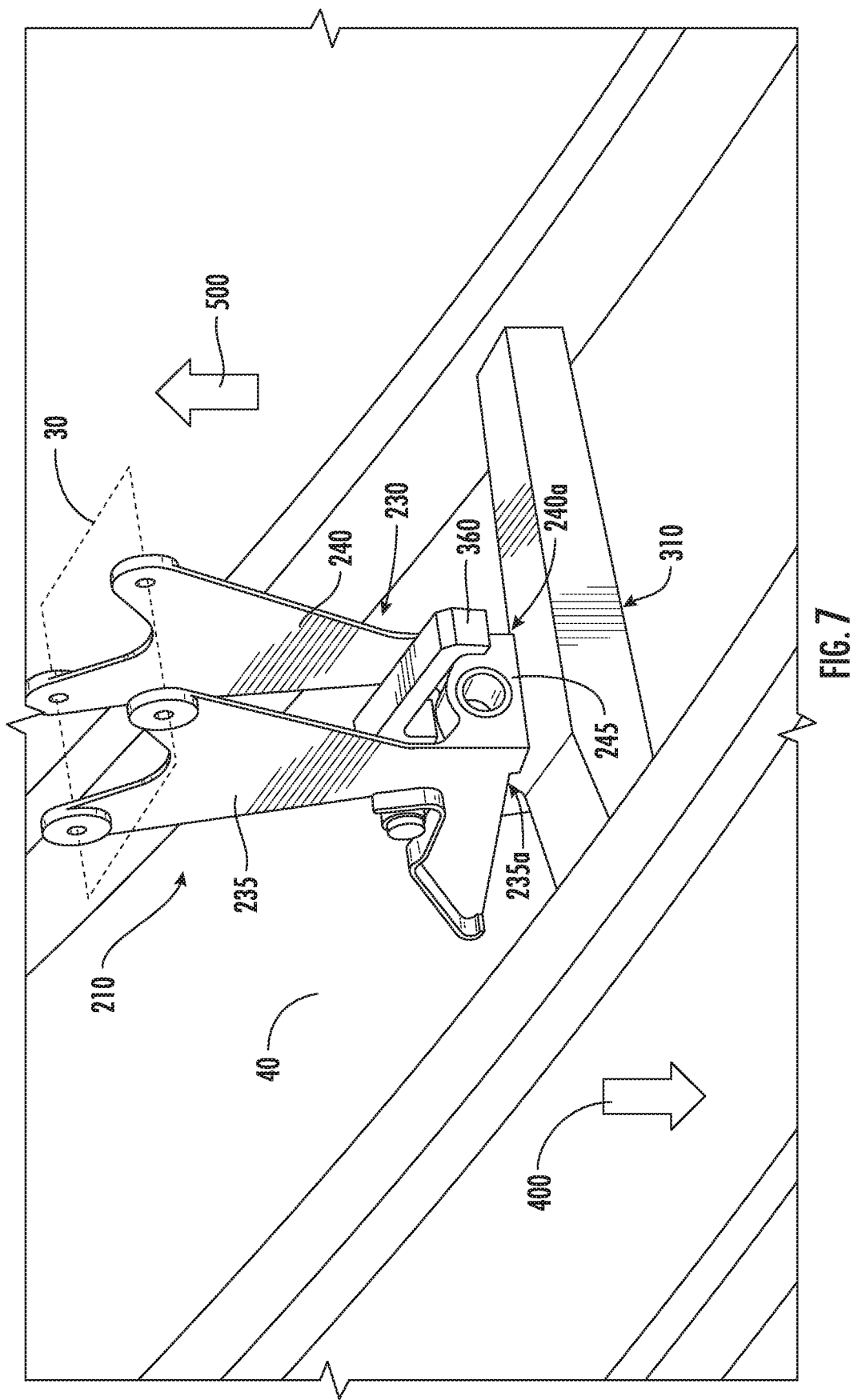
Figure 8:
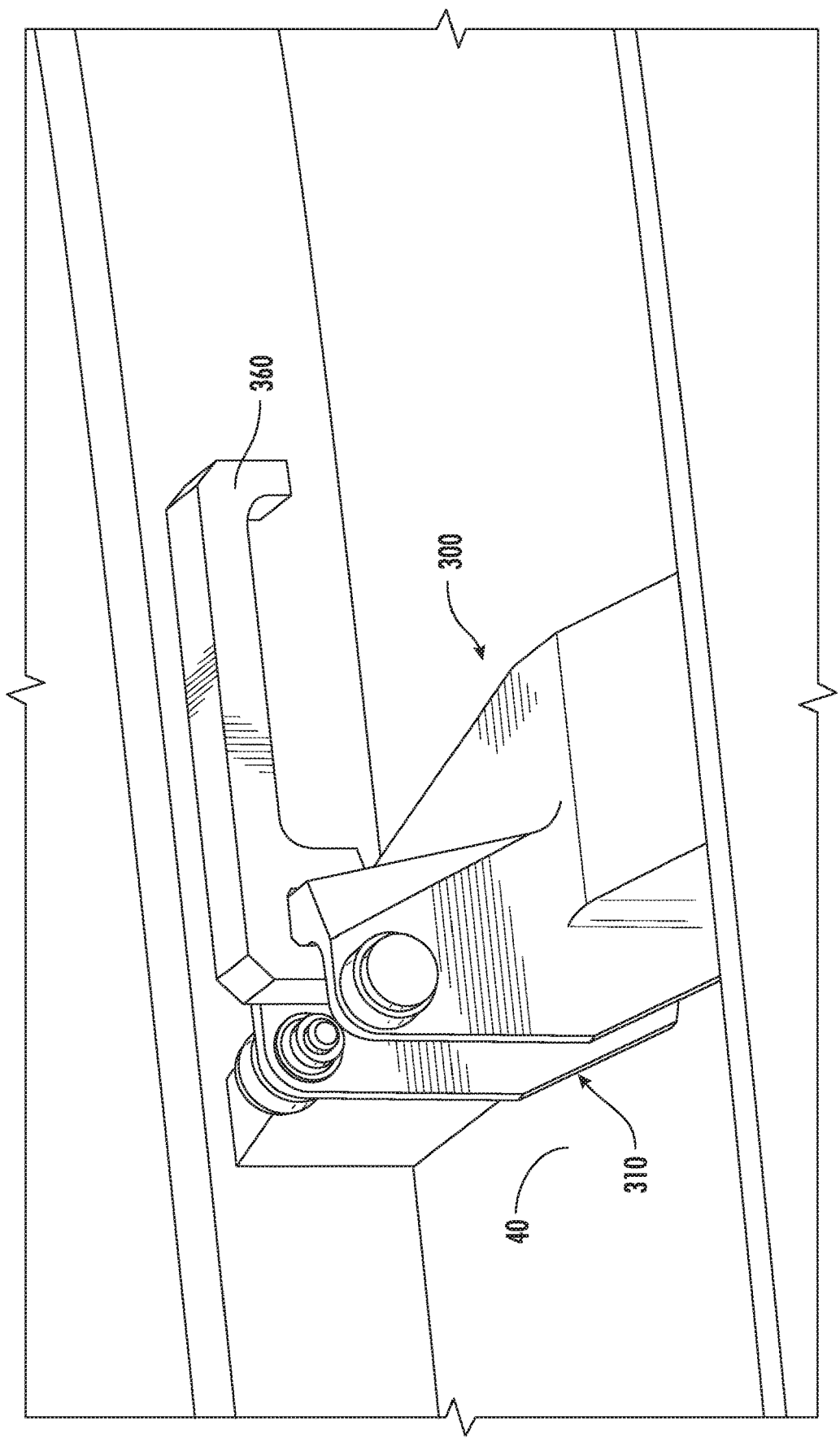
Figure 9:
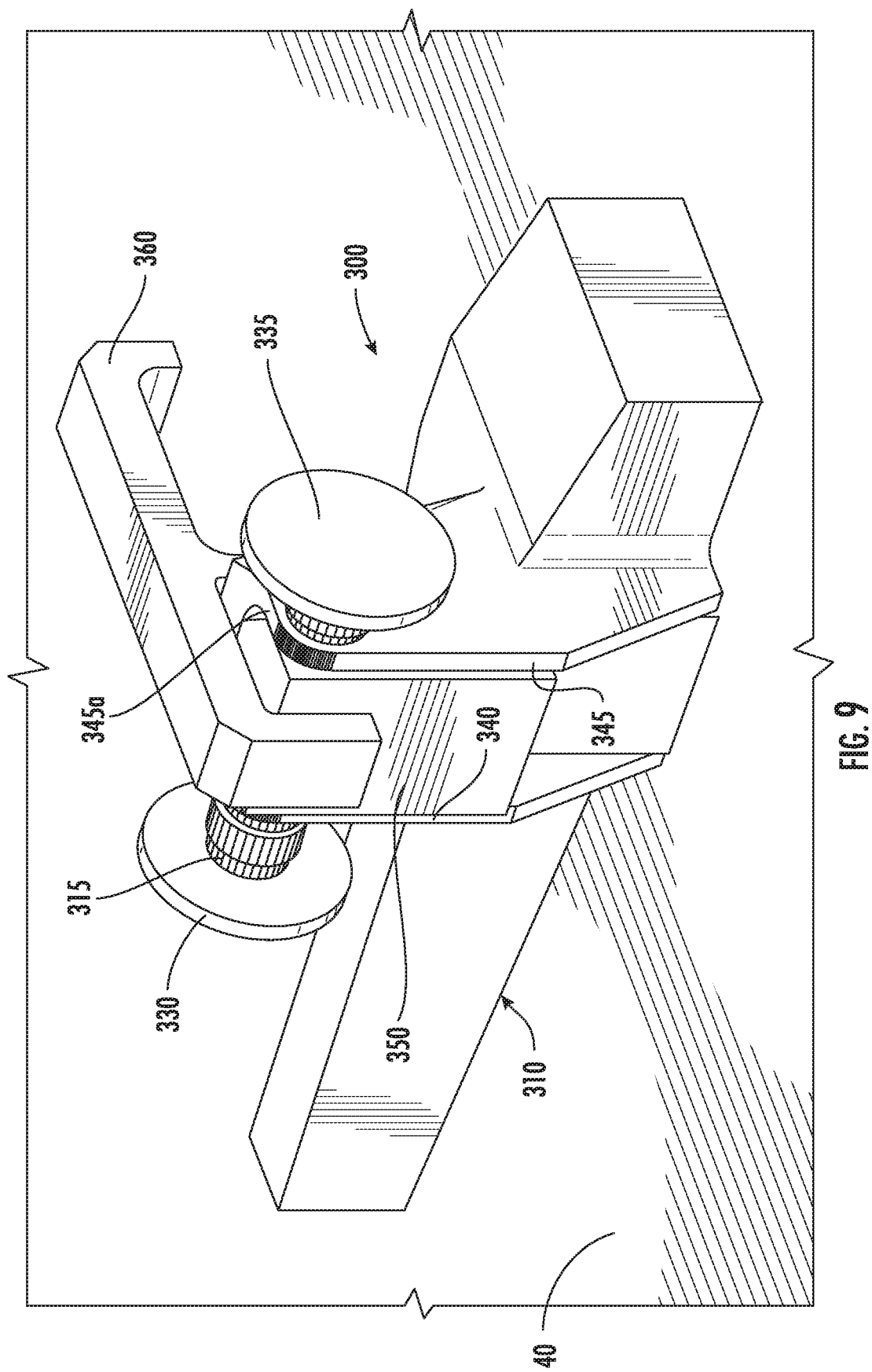
Figure 10:
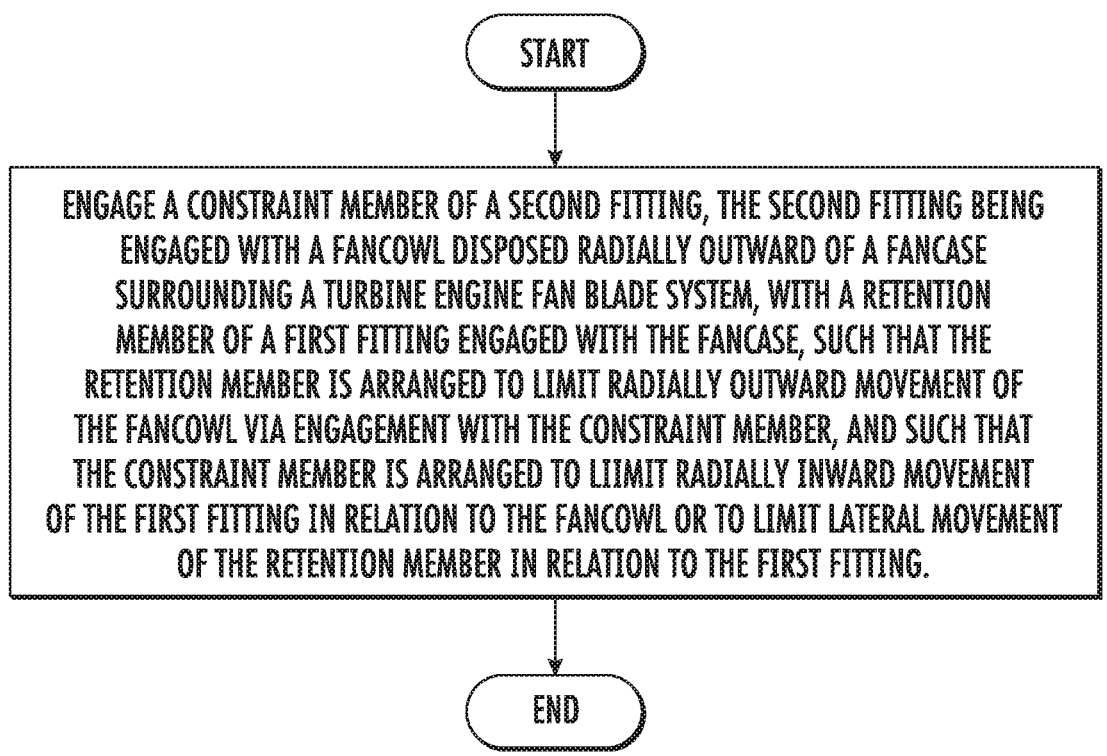

Having thus described the disclosure in general terms, reference will now be made to the accompanying drawings, which are not necessarily drawn to scale, and wherein:

FIG. 1 schematically illustrates a representative turbine engine for an aircraft;

FIG. 2 schematically illustrates a representative turbine engine for an aircraft;

FIG. 3 schematically illustrates a portion of a fancowl of a turbine engine of an aircraft;

FIG. 4 schematically illustrates a portion of a movement-limiting device for a fancase-fancowl arrangement of a turbine engine, according to an example aspect of the present disclosure;

FIG. 5 schematically illustrates a movement-limiting device for a fancase-fancowl arrangement of a turbine engine, according to an example aspect of the present disclosure;

FIG. 6 schematically illustrates a magnified view of a movement-limiting device for a fancase-fancowl arrangement of a turbine engine, according to the example aspect of the present disclosure shown in FIG. 5;

FIG. 7 schematically illustrates a movement-limiting device for a fancase-fancowl arrangement of a turbine engine, according to another example aspect of the present disclosure;

FIG. 8 schematically illustrates a portion of a movement-limiting device for a fancase-fancowl arrangement of a turbine engine, according to the example aspect of the present disclosure shown in FIG. 7;

FIG. 9 schematically illustrates a portion of a movement-limiting device for a fancase-fancowl arrangement of a turbine engine, according to another example aspect of the present disclosure; and FIG. 10 schematically illustrates a method of limiting movement in a turbine engine, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIGS. 1 and 2 schematically illustrate a turbine engine 10, for example, for an aircraft. Generally, in one aspect, the turbine engine 10 includes a rotating fan blade system 20 surrounded by a fancase 30. Because of the nature of the rotating turbine engine fan blade system, the fancase 30 surrounding the fan blade system is generally cylindrical.

The fancase 30, in some instances, is surrounded by a fancowl 40 or otherwise has a fancowl 40 disposed radially outward thereof.

As shown for example in FIGS. 3-7, a first fitting 200 including, in some instances, a retention member 210, is engaged with the fancase 30, and a second fitting 300 is engaged with the fancowl 40, with the first and second fittings 200, 300 collectively defining a movement-limiting device 100 for a fancase-fancowl arrangement of a turbine engine. In some aspects, the second fitting 300 includes a constraint member 310 arranged to be received by the retention member 210 of the first fitting 200, particularly upon the fancowl 40 being placed and arranged to surround the fancase 30. In such aspects, the retention member 210 is arranged to limit radially outward movement (see, e.g., element 400 in FIGS. 5 and 7) of the fancowl 40 via engagement thereof with the constraint member 310, and the constraint member 310 is arranged to allow radially outward movement of the retention member 210 engaged with the fancase 30 (e.g., the first fitting normally supports the fancowl, but is arranged to avoid the second fitting/fancowl absorbing some of the energy associated with radially outward movement of the fancase with respect to the fancowl).

In one aspect, as shown for example in FIG. 4, the retention member 210 comprises at least a support ledge 225. In another aspect, the retention member 210 includes a ramp portion 215 extending to the support ledge 225. In yet another aspect, the retention member 210 includes a detent 220 engaged with the support ledge 225. In still another aspect, the retention member 210 comprises a ramp portion 215 extending to the support ledge 225, with a detent 220 therebetween. In connection with any such aspect, the constraint member 310 comprises a laterally-extending shaft 315 (a portion of which is shown in FIG. 4) having opposed ends, and a flange 330 engaged with at least one of the opposed ends (e.g., element 320 in FIG. 4). The shaft 315 is thus arranged to be received by the support ledge 225, and the flange 330 is arranged to limit lateral movement (see, e.g., element 450 in FIG. 5) between the shaft 315 and the support ledge 225.

In another aspect, as shown for example in FIGS. 5 and 6, the first fitting 200 includes adjacent retention members 210a, 210b. In one instance, each retention member 210a, 210b respectively comprises at least a support ledge 225a, 225b. In another instance, each retention member 210a, 210b includes a ramp portion 215a, 215b extending to the support ledge 225a, 225b. In yet another instance, each retention member 210a, 210b includes a detent 220a, 220b engaged with the support ledge 225a, 225b. In still another instance, each retention member 210a, 210b respectively comprises a ramp portion 215a, 215b extending to the support ledge 225a, 225b, with a detent 220a, 220b therebetween. In any such instance, the constraint member 310 comprises a laterally-extending shaft 315 having opposed ends 320, 325 (see, e.g., FIG. 6) and a flange 330, 335 engaged with each of the opposed ends 320, 325. The shaft 315 is arranged to be received by the support ledges 225a, 225b (e.g., the support ledges 225a, 225b extend in parallel with each other and the shaft 315 extends across both support ledges 225a, 225b) of the adjacent retention members 210a, 210b. With the shaft 315 received by the support ledges 225a, 225b, the flanges 330, 335 engaged with the ends 320, 325 of the shaft 315 are arranged such that the support ledges 225a, 225b are disposed therebetween. In this arrangement, lateral movement of the shaft 315 is limited in relation to the support ledges 225a, 225b adjacent thereto. The flanges 330, 335 engaged with the ends 320, 325 of the shaft 315 and disposed outwardly of the support ledges 225a, 225b thus at least help to limit any lateral separation between the adjacent retention members 210a, 210b.

In accordance with this aspect, as shown for example in FIG. 6, the constraint member 310 further comprises spaced-apart fitting members 340, 345 engaged with the fancowl 40 and extending outward therefrom to respective distal ends 340a, 345a. The fitting members 340, 345 are arranged in various configurations such as, for example, as spaced-apart parallel planar plates. In some instances, the parallel planar plates are connected at one end thereof to form an open channel. In addition, a reinforcement member 350 is disposed between the fitting members 340, 345 about the distal ends 340a, 345a thereof. The fitting members 340, 345 and the reinforcement member 350 cooperate to define a bore extending therethrough (e.g., the bore extending through the fitting members and the reinforcement member), wherein the bore is arranged to receive the shaft 315 therein, with the shaft 315 having a length greater than a distance between the fitting members 340, 345 (e.g., the shaft extends through and beyond each of the fitting member 340, 345). The fitting members 340, 345 and the reinforcement member 350 thus cooperate to support and reinforce the shaft 315 at least to the extent that the shaft 315 extends therethrough.

In another aspect of the present disclosure, as shown for example in FIGS. 7 and 8, the retention member 210 comprises a loop arrangement 230 and the constraint member 310 comprises a hook member 360 arranged to be received through the loop arrangement 230. In one example, the hook member 360 is an inverted hook member. Receipt of the inverted hook member 360 by and through the loop arrangement 230 forms an arrangement for limiting radially inward movement (see, e.g., element 500 in FIGS. 5 and 7) of the retention member 210 engaged with the fancase 30 in relation to the fancowl 40. For example, the first fitting 200/retention member 210, in some instances, includes spaced-apart struts 235, 240 engaged with the fancase 30 and extending outward to respective distal ends 235a, 240a. A crossmember 245 extends between the distal ends 235a, 240a, such that the struts 235, 240 and the crossmember 245 cooperate to form the loop arrangement 230.

In some aspects, the first fitting includes the retention member(s) and the loop arrangement (see, e.g., FIGS. 5-7). That is, in some aspects, the retention member 210 includes spaced-apart struts 235, 240 engaged with the fancase 30 and extending outward to respective distal ends 235a, 240a, and a crossmember 245 extending between the distal ends 235a, 240a, such that the struts 235, 240 and the crossmember 245 cooperate to form the loop arrangement 230. In addition, the first fitting 200 further includes adjacent retention members 210a, 210b, wherein each retention member 210a, 210b comprises at least a support ledge 225a, 225b, or a ramp portion 215a, 215b extending to the support ledge 225a, 225b, with a detent 220a, 220b therebetween. In such aspects, the support ledge 225a, 225b of each retention member 210a, 210b is engaged with and extends laterally from the distal end 235a, 240a of one of the struts 235, 240. In general, the support ledge 225a, 225b extend substantially perpendicularly with respect to and from a respective one of the distal ends 235a, 240a of the struts 235, 240. In this manner, the adjacent retention members 210a, 210b are disposed substantially in parallel, and extend to the engagement between the support ledges 225a, 225b and the distal ends 235a, 240a of the struts 235, 240 which extend substantially perpendicularly to the support ledges 225a, 225b.

In such an aspect, as shown for example in FIG. 9, the constraint member of the second fitting also includes the shaft/flanges, as well as the inverted hook member. That is, in some aspects where the first fitting includes the retention member(s) and the loop arrangement, the second fitting includes the shaft/flanges and the inverted hook member. More particularly, the constraint member 310 includes a laterally-extending shaft 315 having opposed ends 320, 325 (see, e.g., FIG. 6) and a flange 330, 335 engaged with each of the opposed ends 320, 325. As shown for example in FIGS. 5 and 6, the shaft 315 is arranged to be received by the support ledges 225a, 225b (e.g., the support ledges 225a, 225b extend in parallel with each other and the shaft 315 extends across both support ledges 225a, 225b) of the adjacent retention members 210a, 210b. With the shaft 315 is received by the support ledges 225a, 225b, the flanges 330, 335 engaged with the ends 320, 325 of the shaft 315 are arranged such that the support ledges 225a, 225b are disposed therebetween. In this arrangement, lateral movement of the shaft 315 is limited in relation to the support ledges 225a, 225b adjacent thereto. The flanges 330, 335 engaged with the ends 320, 325 of the shaft 315 and disposed outwardly of the support ledges 225a, 225b thus at least help to limit any lateral separation between the adjacent retention members 210a, 210b. As shown for example in FIG. 9, the constraint member 310 further includes an inverted hook member 360 arranged to be received through the loop arrangement 230 as shown for example in FIG. 7. In such an arrangement, the first fitting 200 is arranged to limit radially outward movement of the fancowl 40 via engagement with the second fitting 300. Further, the second fitting 300 is arranged to allow radially outward movement of the first fitting 200 engaged with the fancase 30 (e.g., via the interaction between the shaft/flanges and the retention member(s)), and to limit radially inward movement of the first fitting 200 engaged with the fancase 30 in relation to the fancowl 40 (e.g., via the interaction between the loop arrangement and the inverted hook member).

In particular aspects of the present disclosure, as shown for example in FIG. 3, the fancowl 40 comprises a hemicylindrical member 50 extending lengthwise along, extending over, and covering a portion of the generally cylindrical fancase 30. The hemicylindrical member 50 has a first angular end 55 arranged to be pivotable about an axis 60 extending lengthwise along the fancase 30 and disposed about an upper quadrant thereof, and an opposed second angular end 65. In such aspects, the first fitting 200 is engaged with the fancase 30 (e.g., an exterior surface of the fancase opposite to the turbine engine fan blade system contained within the fancase) about a lower quadrant thereof. The second fitting 300 is engaged with the fancowl 40 about the second angular end 65 thereof. With such an arrangement, the second fitting 300 is arranged to be engageable with the first fitting 200 upon the hemicylindrical member 50 being pivoted to cover the portion of the fancase 30 (e.g., when the hemicylindrical member is pivoted to a closed position extending over and covering the corresponding portion of the fancase).

With such a configuration and arrangement of the fancowl 40 with respect to the fancase 30 of the turbine engine, various aspects of the present disclosure are directed to various arrangements of the first fitting 200 and the second fitting 300 disclosed herein. For example, in one aspect, the first fitting 200 includes the retention member(s) and the second fitting 300 includes the shaft/flanges (see, e.g., the example embodiments shown in FIGS. 4-6). In another aspect, the first fitting 200 includes the loop arrangement and the second fitting 300 includes the inverted hook member (see, e.g., the example embodiments shown in FIGS. 7-8). In yet another aspect, the first fitting 200 includes both the retention member(s) and the loop arrangement, and the second fitting 300 includes both the shaft/flanges and the inverted hook member (see, e.g., the example embodiments shown in FIG. 9).

Accordingly, in one aspect, upon the hemicylindrical member 50 of the fancowl 40 being pivoted to cover the portion of the fancase 30, the shaft 315 is configured and arranged to interact with the support ledges 225a, 225b of the adjacent retention members 210a, 210b. In another aspect, the shaft 315 is configured and arranged to interact with and be guided by the ramp portions 215a, 215b, past the respective detents 220a, 220b, and into interaction with the support ledges 225a, 225b of the adjacent retention members 210a, 210b. As such, the flanges 330, 335 are arranged to limit lateral movement of the shaft 315 in relation to the adjacent retention members 210a, 210b and to limit lateral separation between the adjacent retention members 210a, 210b.

Moreover, upon the hemicylindrical member 50 of the fancowl 40 being pivoted to cover the portion of the fancase 30, the inverted hook member 360 is configured and arranged to be received through the loop arrangement 230. As such, the inverted hook member 360 is arranged to limit radially inward movement of the first fitting 200 engaged with the fancase 30 in relation to the fancowl 40 (e.g., the inverted hook member interacting with the loop arrangement causes the fancowl to absorb some of the energy associated with radially inward movement of the fancase with respect to the fancowl).

In accordance with the foregoing, other aspects of the present disclosure provide a method of limiting movement in a turbine engine, as shown for example in FIG. 10, wherein the turbine engine 10 includes a first fitting 200 having a retention member 210, and wherein the first fitting 200 is engaged with a fancase 30 surrounding a turbine engine fan blade system 20. In such aspects, the method comprises engaging a constraint member 310 of a second fitting 300 with the retention member 210 of the first fitting 200, wherein the second fitting 300 is engaged with a fancowl 40 disposed radially outward of the fancase 30, such that the retention member 210 is arranged to limit radially outward movement 400 of the fancowl 40 via engagement with the constraint member 310, and such that the constraint member 310 is arranged to allow radially outward movement 400 of the retention member 210 engaged with the fancase 30.

In some instances, the first fitting 200 includes adjacent retention members 210a, 210b, wherein each retention member 210a, 210b comprises at least a support ledge 225a, 225b. In other instances, each retention member 210a, 210b comprises a ramp portion 215a, 215b extending to the support ledge 225a, 225b, with a detent 220a, 220b therebetween. In either instance, the constraint member 310 comprises a laterally-extending shaft 315 having opposed ends 320, 325 and a flange 330, 335 engaged with each of the opposed ends 320, 325. The method step of engaging the constraint member with the retention member thus comprises engaging the shaft 315 with the support ledges 225a, 225b of the adjacent retention members 210a, 210b, such that the flanges 330, 335 are arranged to limit lateral movement 450 of the shaft 315 in relation to the adjacent support ledges 225a, 225b and such that the flanges 330, 335 are arranged to limit lateral separation between the adjacent retention members 210a, 210b.

In other instances, the retention member 210 comprises a loop arrangement 230 and the constraint member 310 comprises an inverted hook member 360, wherein the method step of engaging the constraint member with the retention member comprises receiving the inverted hook member 360 through the loop arrangement 230 to limit radially inward movement 500 of the first fitting 200 engaged with the fancase 30 in relation to the fancowl 40.

In further instances, the first fitting 200 includes spaced-apart struts 235, 240 engaged with the fancase 30 and extending outward to respective distal ends 235a, 240a, and a crossmember 245 extending between the distal ends 235a, 240a to form a loop arrangement 230. The first fitting 200 further includes adjacent retention members 210a, 210b, wherein in one aspect, each retention member 210a, 210b comprises at least a support ledge 225a, 225b. In another aspect, each retention member 210a, 210b comprises a ramp portion 215a, 215b extending to the support ledge 225a, 225b, with a detent 220a, 220b therebetween. In either aspect, the support ledge 225a, 225b of each retention member 210a, 210b is engaged with and extends laterally from the distal end 235a, 240a of one of the struts 235, 240. In either aspect, the constraint member 310 comprises a laterally-extending shaft 315 having opposed ends 320, 325 and a flange 330, 335 engaged with each of the opposed ends 320, 325. The constraint member 310 further includes an inverted hook member 360. In such instances, the method step of engaging the constraint member with the retention member comprises engaging the shaft 315 with the support ledges 225a, 225b of the adjacent retention members 210a, 210b, such that the flanges 330, 335 are arranged to limit lateral movement 450 of the shaft 315 in relation to the adjacent support ledges 225a, 225b and to limit lateral separation between the adjacent retention members 210a, 210b. In addition, the method step of engaging the constraint member with the retention member further comprises receiving the inverted hook member 360 through the loop arrangement 230, such that the first fitting 200 is arranged to limit radially outward movement 400 of the fancowl 40 via engagement with the second fitting 300, and such that the second fitting 300 is arranged to allow radially outward movement 400 of the first fitting 200 engaged with the fancase 30 and to limit radially inward movement 500 of the first fitting 200 engaged with the fancase 30 in relation to the fancowl 40.

In still other instances, the fancowl 40 comprises a hemicylindrical member 50 extending lengthwise along and covering a portion of the fancase 30, with the hemicylindrical member 50 having a first angular end 55 arranged to be pivotable about an axis 60 extending lengthwise along the fancase 30 and disposed about an upper quadrant thereof, and an opposed second angular end 65. In addition, the first fitting 200 is engaged with the fancase 30 about a lower quadrant thereof and the second fitting 300 is engaged with the fancowl 40 about the second angular end thereof 65. In such instances, the method further comprises pivoting the hemicylindrical member 50 to cover the portion of the fancase 30 to engage the second fitting 300 with the first fitting 200.

In such instances, the first fitting 200 includes adjacent retention members 201a, 210b, wherein in one aspect each retention member 210a, 210b comprises at least a support ledge 225a, 225b. In another aspect, each retention member 210a, 210b comprises a ramp portion 215a, 215b extending to the support ledge 225a, 225b, with a detent 220a, 220b therebetween. In either aspect, the constraint member 310 comprises a laterally-extending shaft 315 having opposed ends 320, 325 and a flange 330, 335 engaged with each of the opposed ends 320, 325. As such, the method step of pivoting the hemicylindrical member to cover the portion of the fancase comprises interacting the shaft 315 with the support ledges 225a, 225b of the adjacent retention members 210a, 210b, or interacting the shaft 315 with the ramp portions 215a, 215b such that the shaft 315 is guided by the flanges 330, 335, past the detents 220a, 220b, and into interaction with the support ledges 225a, 225b of the adjacent retention members 210a, 210b, such that the flanges 330, 335 are arranged to limit lateral movement 450 of the shaft 315 in relation to the adjacent retention members 210a, 210b and to limit lateral separation between the adjacent retention members 210a, 210b.

Moreover, in such instances, the retention member 210 comprises spaced-apart struts 235, 240 engaged with the fancase 30 and extending outward therefrom to respective distal ends 235a, 240a, and a crossmember 245 extending between the distal ends 235a, 240a to form a loop arrangement 230. The constraint member 310 comprises an inverted hook member 360. As such, the method step of pivoting the hemicylindrical member to cover the portion of the fancase comprises receiving the inverted hook member 360 through the loop arrangement 230 to limit radially inward movement 500 of the first fitting 200 engaged with the fancase 30 in relation to the fancowl 40. In some aspects, the interaction between the inverted hook member 360 and the loop arrangement 230 also prevents the hemicylindrical member 50 from pivoting to an open position (e.g., not covering the portion of the fancase 30), in the event of less-than-optimal performance of the fan blade system 20/fancase 30 of the turbine engine 10).

The movement limiting system disclosed herein is thus capable of appropriately locating the pivoting portion of a fancowl in relation to the underlying fancase, when the pivoting portion is pivoted to the closed position. The movement limiting system is arranged to guide the second fitting into engagement with the first fitting, upon the pivoting portion being pivoted to the closed position, so as to facilitate proper location of the pivoting portion. Moreover, with the pivoting portion in the closed position, the movement limiting system is configured and arranged to attenuate radially outward force loads (e.g., limit load transfer) from the fancase to the fancowl. With the pivoting portion in the closed position, the movement limiting system limits movement of the first fitting relative to the second fitting. The movement limiting system disclosed herein may therefore inhibit or attenuate displacement of or damage to the fancowl.

The present disclosure thus includes, without limitation, the following clauses:

Clause 1: A movement-limiting device for a turbine engine, comprising: a first fitting including a retention member, the first fitting being engaged with a fancase surrounding a turbine engine fan blade system; and a second fitting engaged with a fancowl disposed radially outward of the fancase, the second fitting including a constraint member arranged to be received by the retention member of the first fitting, the retention member being arranged to limit radially outward movement of the fancowl via engagement with the constraint member, and the constraint member comprising at least one of (i) a hook member arranged to limit radially inward movement of the first fitting in relation to the fancowl or (ii) a laterally-extending shaft having opposed ends and a flange engaged with at least one of the opposed ends, arranged to limit lateral movement of the retention member in relation to the first fitting.

Clause 2: The device of any preceding clause, or any combination of preceding clauses, wherein the retention member comprises a support ledge, and wherein the constraint member comprises the laterally-extending shaft having opposed ends and the flange engaged with at least one of the opposed ends, the shaft being arranged to be received by the support ledge and the flange being arranged to limit lateral movement between the shaft and the support ledge.

Clause 3: The device of Clause 2, or any combination of preceding clauses, wherein the retention member comprises a ramp portion extending to the support ledge, and a detent between the ramp portion and the support ledge.

Clause 4: The device of any preceding clause, or any combination of preceding clauses, wherein the first fitting includes adjacent retention members, each retention member comprising a support ledge, and wherein the constraint member comprises a laterally-extending shaft having opposed ends and a flange engaged with each of the opposed ends, the shaft being arranged to be received by the support ledges of the adjacent retention members, with the flanges being arranged to limit lateral movement of the shaft in relation to the support ledges and to limit lateral separation between the adjacent retention members.

Clause 5: The device of Clause 4, wherein each retention member comprises a ramp portion extending to the support ledge, and a detent between the ramp portion and the support ledge.

Clause 6: The device of any of Clauses 4-5, wherein the constraint member further comprises spaced-apart fitting members engaged with the fancowl and extending outward therefrom to respective distal ends, and a reinforcement member disposed between the fitting members about the distal ends thereof, the fitting members and the reinforcement member cooperating to define a bore extending therethrough, the bore being arranged to receive the shaft therein, with the shaft having a length greater than a distance between the fitting members.

Clause 7: The device of any preceding clause, or any combination of preceding clauses, wherein the retention member comprises a loop arrangement and the hook member comprises an inverted hook member engaged with the constraint member and arranged to be received through the loop arrangement to limit radially inward movement of the first fitting engaged with the fancase in relation to the fancowl.

Clause 8: The device of Clause 1, wherein the first fitting includes spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts, and wherein the constraint member comprises a laterally-extending shaft having opposed ends and a flange engaged with each of the opposed ends, the shaft being arranged to be received by the support ledges of the adjacent retention members, with the flanges being arranged to limit lateral movement of the shaft in relation to the support ledges and to limit lateral separation between the adjacent retention members, the constraint member further including an inverted hook member arranged to be received through the loop arrangement, wherein the first fitting is arranged to limit radially outward movement of the fancowl via engagement with the second fitting, and the second fitting is arranged to allow radially outward movement of the first fitting engaged with the fancase and to limit radially inward movement of the first fitting engaged with the fancase in relation to the fancowl.

Clause 9: The device of Clause 8, wherein each retention member comprises a ramp portion extending to a support ledge, with a detent between the ramp portion and the support ledge.

Clause 10: The device of any preceding clause, or any combination of preceding clauses, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

Clause 11: The device of Clause 10, wherein the first fitting includes adjacent retention members, each retention member comprising a support ledge, and wherein the constraint member comprises a laterally-extending shaft having opposed ends and a flange engaged with each of the opposed ends, the shaft being arranged to interact with the support ledges of the adjacent retention members, upon the hemicylindrical member being pivoted to cover the portion of the fancase, with the flanges being arranged to limit lateral movement of the shaft in relation to the adjacent retention members and to limit lateral separation therebetween.

Clause 12: The device of any of Clauses 10-11, wherein each retention member comprises a ramp portion extending to a support ledge, with a detent between the ramp portion and the support ledge, and wherein the shaft is arranged to interact with and be guided by the ramp portions, past the detents, and into interaction with the support ledges of the adjacent retention members, upon the hemicylindrical member being pivoted to cover the portion of the fancase.

Clause 13: The device of any of Clause 10-12, wherein the retention member comprises spaced-apart struts engaged with the fancase and extending outward therefrom to respective distal ends, and a crossmember extending between the distal ends to form a loop arrangement, and wherein the constraint member comprises an inverted hook member arranged to be received through the loop arrangement, upon the hemicylindrical member being pivoted to cover the portion of the fancase, to limit radially inward movement of the first fitting engaged with the fancase in relation to the fancowl.

Clause 14: The device of any of clauses 1-13, wherein the constraint member is arranged to allow radially outward movement of the retention member engaged with the fancase.

Clause 15: A movement-limiting device for a turbine engine having a fancase surrounding a turbine engine fan blade system, the device comprising: a first fitting including spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts; and a second fitting engaged with a fancowl disposed radially outward of the fancase, the second fitting including a laterally-extending shaft having opposed ends and a flange engaged with each of the opposed ends, the shaft being arranged to be received by the support ledges, with the flanges being arranged to limit lateral movement of the shaft in relation to the support ledges and to limit lateral separation between the adjacent retention members, wherein the first fitting is arranged to limit radially outward movement of the fancowl via engagement with the second fitting.

Clause 16: The device of Clause 15, wherein each retention member comprises a ramp portion extending to the support ledge, and a detent between the ramp portion and the support ledge.

Clause 17: The device of any of Clauses 15-16, or any combination of preceding clauses, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

Clause 18: The device of Clause 17, wherein the shaft of the second fitting is arranged to interact with the support ledges of the adjacent retention members of the first fitting, upon the hemicylindrical member being pivoted to cover the portion of the fancase, with the flanges being arranged to limit lateral movement of the shaft in relation to the support ledges of the first fitting.

Clause 19: The device of any Clauses 17-18, wherein each retention member comprises a ramp portion extending to the support ledge, and a detent between the ramp portion and the support ledge, and wherein the shaft of the second fitting is arranged to interact with and be guided by the ramp portions, past the detents, and into interaction with the support ledges of the adjacent retention members of the first fitting, upon the hemicylindrical member being pivoted to cover the portion of the fancase, with the flanges being arranged to limit lateral movement of the shaft in relation to the ramp portions, detents, and support ledges of the first fitting.

Clause 20: The device of any of Clauses 17-19, wherein the second fitting further comprises an inverted hook member arranged to be received through the loop arrangement, upon the hemicylindrical member being pivoted to cover the portion of the fancase, to limit radially inward movement of the first fitting engaged with the fancase in relation to the fancowl.

Clause 21: The device of any of Clauses 15-20, wherein the second fitting is arranged to allow radially outward movement of the first fitting engaged with the fancase.

Clause 22: A movement-limiting device for a turbine engine having a fancase surrounding a turbine engine fan blade system, the device comprising: a first fitting including spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts; and a second fitting engaged with a fancowl disposed radially outward of the fancase, the second fitting including an inverted hook member arranged to be received through the loop arrangement, to limit radially inward movement of the first fitting engaged with the fancase in relation to the fancowl.

Clause 23: The device of Clause 22, wherein each retention member comprises a ramp portion extending to the support ledge, and a detent between the ramp portion and the support ledge.

Clause 24: The device of any of Clauses 22-23, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

Clause 25: The device of any of Clauses 22-24, wherein the second fitting further comprises a laterally-extending shaft having opposed ends and a flange engaged with each of the opposed ends, the shaft being arranged to be received by the support ledges of the adjacent retention members, with the flanges being arranged to limit lateral movement of the shaft in relation to the adjacent support ledges and to limit lateral separation between the adjacent retention members, and wherein the first fitting is arranged to limit radially outward movement of the fancowl via engagement with the second fitting, and the second fitting is arranged to allow radially outward movement of the first fitting engaged with the fancase Clause 26: The device of Clause 25, or any combination of preceding clauses, wherein the shaft of the second fitting is arranged to interact with the support ledges of the adjacent retention members of the first fitting, upon the hemicylindrical member being pivoted to cover the portion of the fancase, with the flanges being arranged to limit lateral movement of the shaft in relation to the adjacent support ledges of the first fitting.

Clause 27: The device of any of Clauses 25-26, wherein each retention member comprises a ramp portion extending to the support ledge, and a detent between the ramp portion and the support ledge, and wherein the shaft of the second fitting is arranged to interact with and be guided by the ramp portions, past the detents, and into interaction with the support ledges of the adjacent retention members of the first fitting, upon the hemicylindrical member being pivoted to cover the portion of the fancase, with the flanges being arranged to limit lateral movement of the shaft in relation to the adjacent ramp portions, support ledges, and detents of the first fitting.

Clause 28: A movement-limiting device for a turbine engine having a fancase surrounding a turbine engine fan blade system, the device comprising: a first fitting including spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts; and a second fitting engaged with a fancowl disposed radially outward of the fancase, the second fitting including a laterally-extending shaft having opposed ends and a flange engaged with each of the opposed ends, the shaft being arranged to be received by the support ledges of the adjacent retention members, with the flanges being arranged to limit lateral movement of the shaft in relation to the adjacent support ledges and to limit lateral separation between the adjacent retention members, the second fitting further including an inverted hook member arranged to be received through the loop arrangement, wherein the first fitting is arranged to limit radially outward movement of the fancowl via engagement with the second fitting, and the second fitting is arranged to limit radially inward movement of the first fitting engaged with the fancase in relation to the fancowl.

Clause 29: The device of Clause 28, or any combination of preceding clauses, wherein each retention member comprises a ramp portion extending to the support ledge, and a detent between the ramp portion and the support ledge.

Clause 30: The device of any of Clauses 28-29, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

Clause 31: The device of Clause 30, wherein the shaft of the second fitting is arranged to interact with the support ledges of the adjacent retention members of the first fitting, upon the hemicylindrical member being pivoted to cover the portion of the fancase, with the flanges being arranged to limit lateral movement of the shaft in relation to the adjacent support ledges of the first fitting.

Clause 32: The device of any of Clauses 30-31, wherein each retention member comprises a ramp portion extending to the support ledge, and a detent between the ramp portion and the support ledge, and wherein the shaft of the second fitting is arranged to interact with and be guided by the ramp portions, past the detents, and into interaction with the support ledges of the adjacent retention members of the first fitting, upon the hemicylindrical member being pivoted to cover the portion of the fancase, with the flanges being arranged to limit lateral movement of the shaft in relation to the adjacent ramp portions, support ledges, and detents of the first fitting.

Clause 33: The device of any of Clauses 30-32, wherein the inverted hook member is arranged to be received through the loop arrangement, upon the hemicylindrical member being pivoted to cover the portion of the fancase.

Clause 34: The device of any of Clauses 28-33, wherein the second fitting is arranged to allow radially outward movement of the first fitting engaged with the fancase.

Clause 35: A method of limiting movement in a turbine engine including a first fitting having a retention member and being engaged with a fancase surrounding a turbine engine fan blade system, the method comprising: engaging a constraint member of a second fitting, the second fitting being engaged with a fancowl disposed radially outward of the fancase, with the retention member of the first fitting, such that the retention member is arranged to limit radially outward movement of the fancowl via engagement with the constraint member, and such that the constraint member is arranged to limit radially inward movement of the first fitting in relation to the fancowl or to limit lateral movement of the retention member in relation to the first fitting.

Clause 36: The method of Clause 35, wherein the first fitting includes adjacent retention members, each retention member comprising a support ledge, wherein the constraint member comprises a laterally-extending shaft having opposed ends and a flange engaged with each of the opposed ends, and wherein engaging the constraint member with the retention member comprises engaging the shaft with the support ledges of the adjacent retention members, such that the flanges are arranged to limit lateral movement of the shaft in relation to the adjacent support ledges and to limit lateral separation between the adjacent retention members.

Clause 37: The method of any of Clauses 35-36, or any combination of preceding clauses, wherein the retention member comprises a loop arrangement and the constraint member comprises an inverted hook member, and wherein engaging the constraint member with the retention member comprises receiving the inverted hook member through the loop arrangement to limit radially inward movement of the first fitting engaged with the fancase in relation to the fancowl.

Clause 38: The method of any of Clauses 35-37, wherein the first fitting includes spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts, wherein the constraint member comprises a laterally-extending shaft having opposed ends and a flange engaged with each of the opposed ends, the constraint member further including an inverted hook member, and wherein engaging the constraint member with the retention member comprises engaging the shaft with the support ledges of the adjacent retention members, such that the flanges are arranged to limit lateral movement of the shaft in relation to the adjacent support ledges and to limit lateral separation between the adjacent retention members, and receiving the inverted hook member through the loop arrangement, such that the first fitting is arranged to limit radially outward movement of the fancowl via engagement with the second fitting, and such that the second fitting is arranged to allow radially outward movement of the first fitting engaged with the fancase and to limit radially inward movement of the first fitting engaged with the fancase in relation to the fancowl.

Clause 39: The method of any of Clauses 35-38, or any combination of preceding clauses, wherein the fancowl comprises a hemicylindrical member extending lengthwise along and covering a portion of the fancase, wherein the first fitting is engaged with the fancase and the second fitting is engaged with the fancowl, and wherein the method further comprises pivoting the hemicylindrical member to cover the portion of the fancase to engage the second fitting with the first fitting.

Clause 40: The method of Clause 39, wherein the first fitting includes adjacent retention members, each retention member comprising a support ledge, wherein the constraint member comprises a laterally-extending shaft having opposed ends and a flange engaged with each of the opposed ends, and wherein pivoting the hemicylindrical member to cover the portion of the fancase comprises interacting the shaft with the support ledges of the adjacent retention members, and such that the flanges are arranged to limit lateral movement of the shaft in relation to the adjacent retention members and to limit lateral separation therebetween.

Clause 41: The method of any of Clauses 39-40, wherein the first fitting includes adjacent retention members, each retention member comprising a ramp portion extending to a support ledge, with a detent therebetween, wherein the constraint member comprises a laterally-extending shaft having opposed ends and a flange engaged with each of the opposed ends, and wherein pivoting the hemicylindrical member to cover the portion of the fancase comprises interacting the shaft with the ramp portions such that the shaft is guided by the flanges, past the detents, and into interaction with the support ledges of the adjacent retention members, and such that the flanges are arranged to limit lateral movement of the shaft in relation to the adjacent retention members and to limit lateral separation therebetween.

Clause 42: The method of any of Clauses 39-41, or any combination of preceding clauses, wherein the retention member comprises spaced-apart struts engaged with the fancase and extending outward therefrom to respective distal ends, and a crossmember extending between the distal ends to form a loop arrangement, wherein the constraint member comprises an inverted hook member, and wherein pivoting the hemicylindrical member to cover the portion of the fancase comprises receiving the inverted hook member through the loop arrangement to limit radially inward movement of the first fitting engaged with the fancase in relation to the fancowl.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A movement-limiting device for a turbine engine, comprising:

a first fitting including a retention member, the first fitting being engaged with a fancase surrounding a turbine engine fan blade system; and a second fitting engaged with a fancowl disposed radially outward of the fancase, the second fitting including a constraint member comprising spaced-apart fittings engaged with the fancowl and extending outward therefrom to respective distal ends, and a reinforcement disposed between the fittings about the distal ends thereof, the fittings and the reinforcement cooperating to define a bore extending therethrough, the constraint member being arranged to be received by the retention member of the first fitting and the retention member being arranged to limit radially outward movement of the fancowl via engagement with the constraint member, the constraint member comprising at least one of:

(i) a hook member arranged to limit radially inward movement of the first fitting in relation to the fancowl, or (ii) a laterally-extending shaft having opposed ends and a first flange engaged with one of the opposed ends, wherein the bore is arranged to receive the shaft therein, with the shaft having a length greater than a distance between the fittings, and wherein the constraint member is arranged to limit lateral movement of the retention member in relation to the first fitting.

2. The device of claim 1, wherein the retention member comprises a support ledge, and wherein the constraint member comprises the laterally-extending shaft having opposed ends and the first flange engaged with one of the opposed ends, the shaft being arranged to be received by the support ledge and the flange being arranged to limit lateral movement between the shaft and the support ledge.

3. The device of claim 2, wherein the retention member comprises a ramp portion extending to the support ledge, and a detent between the ramp portion and the support ledge.

4. The device of claim 1, wherein the first fitting includes adjacent retention members, each retention member comprising a support ledge, and wherein the constraint member comprises the laterally-extending shaft having the opposed ends, with the opposed ends each having one flange engaged therewith, the shaft being arranged to be received by the support ledges of the adjacent retention members, with the flanges being arranged to limit lateral movement of the shaft in relation to the support ledges and to limit lateral separation between the adjacent retention members.

5. The device of claim 4, wherein each retention member comprises a ramp portion extending to the support ledge, and a detent between the ramp portion and the support ledge.

6. The device of claim 1, wherein the retention member comprises a loop arrangement and the constraint member comprises the hook member arranged to limit radially inward movement of the first fitting in relation to the fancowl, the hook member being an inverted hook member engaged with the constraint member and arranged to be received through the loop arrangement to limit radially inward movement of the first fitting engaged with the fancase in relation to the fancowl.

7. The device of claim 1, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

8. The device of claim 7, wherein the first fitting includes adjacent retention members, each retention member comprising a support ledge, and wherein the constraint member comprises the laterally-extending shaft having the opposed ends, with the opposed ends each having one flange engaged therewith, the shaft being arranged to interact with the support ledges of the adjacent retention members, upon the hemicylindrical member being pivoted to cover the portion of the fancase, with the flanges being arranged to limit lateral movement of the shaft in relation to the adjacent retention members and to limit lateral separation therebetween.

9. The device of claim 7, wherein the first fitting includes adjacent retention members, wherein each retention member comprises a ramp portion extending to a support ledge, with a detent between the ramp portion and the support ledge, and wherein the constraint member comprises the laterally-extending shaft arranged to interact with and be guided by the ramp portions, past the detents, and into interaction with the support ledges of the adjacent retention members, upon the hemicylindrical member being pivoted to cover the portion of the fancase.

10. The device of claim 7, wherein the retention member comprises spaced-apart struts engaged with the fancase and extending outward therefrom to respective distal ends, and a crossmember extending between the distal ends to form a loop arrangement, and wherein the constraint member comprises the hook member formed as an inverted hook member arranged to be received through the loop arrangement, upon the hemicylindrical member being pivoted to cover the portion of the fancase, to limit radially inward movement of the first fitting engaged with the fancase in relation to the fancowl.

11. The device of claim 1, wherein the constraint member is arranged to allow radially outward movement of the retention member engaged with the fancase.

12. A movement-limiting device for a turbine engine having a fancase surrounding a turbine engine fan blade system, the device comprising:
a first fitting including spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts; and
a second fitting engaged with a fancowl disposed radially outward of the fancase, the second fitting including a laterally-extending shaft having opposed ends and a flange engaged with each of the opposed ends, the shaft being arranged to be received by the support ledges, with the flanges being arranged to limit lateral movement of the shaft in relation to the support ledges and to limit lateral separation between the adjacent retention members, wherein the first fitting is arranged to limit radially outward movement of the fancowl via engagement with the second fitting.

13. The device of claim 12, wherein each retention member comprises a ramp portion extending to the support ledge, and a detent between the ramp portion and the support ledge.

14. The device of claim 12, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

15. The device of claim 14, wherein the shaft of the second fitting is arranged to interact with the support ledges of the adjacent retention members of the first fitting, upon the hemicylindrical member being pivoted to cover the portion of the fancase, with the flanges being arranged to limit lateral movement of the shaft in relation to the support ledges of the first fitting.

16. The device of claim 14, wherein each retention member comprises a ramp portion extending to the support ledge, and a detent between the ramp portion and the support ledge, and wherein the shaft of the second fitting is arranged to interact with and be guided by the ramp portions, past the detents, and into interaction with the support ledges of the adjacent retention members of the first fitting, upon the hemicylindrical member being pivoted to cover the portion of the fancase, with the flanges being arranged to limit lateral movement of the shaft in relation to the ramp portions, detents, and support ledges of the first fitting.

17. The device of claim 14, wherein the second fitting further comprises an inverted hook member arranged to be received through the loop arrangement, upon the hemicylindrical member being pivoted to cover the portion of the fancase, to limit radially inward movement of the first fitting engaged with the fancase in relation to the fancowl.

18. The device of claim 12, wherein a constraint member is arranged to allow radially outward movement of the retention member engaged with the fancase.

19. A movement-limiting device for a turbine engine having a fancase surrounding a turbine engine fan blade system, the device comprising:
a first fitting including spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts; and
a second fitting engaged with a fancowl disposed radially outward of the fancase, the second fitting including an inverted hook member arranged to be received through the loop arrangement, to limit radially inward movement of the first fitting engaged with the fancase in relation to the fancowl.

20. The device of claim 19, wherein each retention member comprises a ramp portion extending to the support ledge, and a detent between the ramp portion and the support ledge.

21. The device of claim 19, wherein the fancowl comprises a hemicylindrical member extending lengthwise along and covering a portion of the fancase, the hemicylindrical member having a first angular end arranged to be pivotable about an axis extending lengthwise along the fancase and disposed about an upper quadrant thereof, and an opposed second angular end, and wherein the first fitting is engaged with the fancase about a lower quadrant thereof and the second fitting is engaged with the fancowl about the second angular end thereof to be engageable with the first fitting upon the hemicylindrical member being pivoted to cover the portion of the fancase.

22. The device of claim 19, wherein the second fitting further comprises a laterally-extending shaft having opposed ends and a flange engaged with each of the opposed ends, the shaft being arranged to be received by the support ledges of the adjacent retention members, with the flanges being arranged to limit lateral movement of the shaft in relation to the adjacent support ledges and to limit lateral separation between the adjacent retention members, and wherein the first fitting is arranged to limit radially outward movement of the fancowl via engagement with the second fitting, and the second fitting is arranged to allow radially outward movement of the first fitting engaged with the fancase.

23. The device of claim 22, wherein the shaft of the second fitting is arranged to interact with the support ledges of the adjacent retention members of the first fitting, upon a hemicylindrical member being pivoted to cover a portion of the fancase, with the flanges being arranged to limit lateral movement of the shaft in relation to the adjacent support ledges of the first fitting.

24. The device of claim 22, wherein each retention member comprises a ramp portion extending to the support ledge, and a detent between the ramp portion and the support ledge, and wherein the shaft of the second fitting is arranged to interact with and be guided by the ramp portions, past the detents, and into interaction with the support ledges of the adjacent retention members of the first fitting, upon the hemicylindrical member being pivoted to cover the portion of the fancase, with the flanges being arranged to limit lateral movement of the shaft in relation to the adjacent ramp portions, support ledges, and detents of the first fitting.

25. A method of limiting movement in a turbine engine including a first fitting having a retention member and being engaged with a fancase surrounding a turbine engine fan blade system, the method comprising:
engaging a constraint member of a second fitting, the second fitting being engaged with a fancowl disposed radially outward of the fancase, with the retention member of the first fitting, such that the retention member is arranged to limit radially outward movement of the fancowl via engagement with the constraint member;
engaging spaced-apart fittings of the constraint member with the fancowl, the spaced-apart fittings extending outward therefrom to respective distal ends, and a reinforcement disposed between the fittings about the distal ends thereof, the fittings and the reinforcement cooperating to define a bore extending therethrough; and
arranging the constraint member to receive a laterally-extending shaft therein, with the shaft having a length greater than a distance between the fittings, and limit radially inward movement of the first fitting in relation to the fancowl or to limit lateral movement of the retention member in relation to the first fitting.

26. The method of claim 25, wherein the first fitting includes adjacent retention members, each retention member comprising a support ledge, wherein the constraint member comprises a laterally-extending shaft having opposed ends and a flange engaged with each of the opposed ends, and wherein engaging the constraint member with the retention member comprises engaging the shaft with the support ledges of the adjacent retention members, such that the flanges are arranged to limit lateral movement of the shaft in relation to the adjacent support ledges and to limit lateral separation between the adjacent retention members.

27. The method of claim 25, wherein the retention member comprises a loop arrangement and the constraint member comprises an inverted hook member, and wherein engaging the constraint member with the retention member comprises receiving the inverted hook member through the loop arrangement to limit radially inward movement of the first fitting engaged with the fancase in relation to the fancowl.

28. The method of claim 25, wherein the fancowl comprises a hemicylindrical member extending lengthwise along and covering a portion of the fancase, wherein the first fitting is engaged with the fancase and the second fitting is engaged with the fancowl, and wherein the method further comprises pivoting the hemicylindrical member to cover the portion of the fancase to engage the second fitting with the first fitting.

29. A movement-limiting device for a turbine engine, comprising:
a first fitting including a retention member, the first fitting being engaged with a fancase surrounding a turbine engine fan blade system; and
a second fitting engaged with a fancowl disposed radially outward of the fancase, the second fitting including a constraint member arranged to be received by the retention member of the first fitting, the retention member being arranged to limit radially outward movement of the fancowl via engagement with the constraint member, and the constraint member comprising at least one of (i) a hook member arranged to limit radially inward movement of the first fitting in relation to the fancowl or (ii) a laterally-extending shaft having opposed ends and a first flange engaged with one of the opposed ends, with the constraint member being arranged to limit lateral movement of the retention member in relation to the first fitting,
wherein the first fitting includes spaced-apart struts engaged with the fancase and extending outward to respective distal ends, and a crossmember extending between the distal ends to form a loop arrangement, the first fitting further including adjacent retention members, each retention member comprising a support ledge engaged with and extending laterally from the distal end of one of the struts,
wherein, when the constraint member comprises the laterally-extending shaft having the opposed ends, the opposed ends each have one flange engaged therewith, the shaft is arranged to be received by the support ledges of the adjacent retention members, with the flanges being arranged to limit lateral movement of the shaft in relation to the support ledges and to limit lateral separation between the adjacent retention members, and
wherein, when the constraint member comprises the hook member, the hook member is an inverted hook member arranged to be received through the loop arrangement, wherein the first fitting is arranged to limit radially outward movement of the fancowl via engagement with the second fitting, and the second fitting is arranged to allow radially outward movement of the first fitting engaged with the fancase and to limit radially inward movement of the first fitting engaged with the fancase in relation to the fancowl.

30. The device of claim 29, wherein each retention member comprises a ramp portion extending to a support ledge, with a detent between the ramp portion and the support ledge.

* * * * *